United States Patent Office 3,743,676
Patented July 3, 1973

3,743,676
1-AMINOPHOSPHOLENE-1-OXIDES
Curtis P. Smith, Cheshire, and Henri Ulrich, North Branford, Conn., assignors to The Upjohn Company, Kalamazoo, Mich.
No Drawing. Filed Sept. 8, 1971, Ser. No. 178,813
Int. Cl. C07d 105/02
U.S. Cl. 260—551 P                          3 Claims

ABSTRACT OF THE DISCLOSURE

Compounds are disclosed having the general formula:

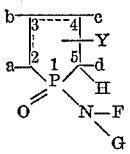

wherein $a$, $b$, $c$ and $d$ are each selected from the group consisting of hydrogen, halogen, alkoxy of 1 to 6 carbon atoms, inclusive, phenoxy, hydrocarbyl and halogen substituted hydrocarbyl; said hydrocarbyl having 1 to 6 carbon atoms, inclusive; F is selected from the group consisting of hydrogen, alkyl of 1 to 12 carbon atoms, inclusive and hydroxyalkyl of 2 to 6 carbon atoms, inclusive; G is hydroxyalkyl of 2 to 6 carbon atoms, inclusive; the broken line indicates a double bond located between the carbon atom at position 3 and one of the two carbon atoms at positions 2 and 4; Y is hydrogen and is attached to which ever carbon atom of those at positions 2 and 4 is not part of said double bond. Disclosed also are methods of preparing the novel compounds.

The compounds of the invention are useful as surfactants and as reactive flame retardant components of polymer systems such as polyolefins, polyurethanes and polyesters.

BACKGROUND OF THE INVENTION (1) Field of the invention

The invention relates to novel heterocyclic phosphorus compounds, and is more particularly concerned with novel 1-alkanolaminophospholene-1-oxides and with methods of their preparation.

(2) Detailed description of the prior art

The 1-dialkylamino phospholene-1-oxides have been described previously; see U.S. Pat. 3,345,287; Belgian Pat. 631,416.

SUMMARY OF THE INVENTION

The invention comprises compounds of the formula:

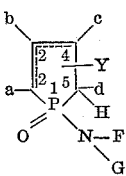

(I)

wherein $a$, $b$, $c$ and $d$ are each selected from the group consisting of hydrogen, halogen, alkoxy of 1 to 6 carbon atoms, inclusive, phenoxy, hydrocarbyl and halogen substituted hydrocarbyl; said hydrocarbyl having 1 to 6 carbon atoms, inclusive; F is selected from the group consisting of hydrogen, alkyl of 1 to 12 carbon atoms, inclusive, and hydroxyalkyl of 2 to 6 carbon atoms, inclusive; G is hydroxyalkyl of 2 to 6 carbon atoms, inclusive; the broken line indicates a double bond located between the carbon atom at position 3 and one of the two carbon atoms at positions 2 and 4; and Y is hydrogen and is atached to whichever carbon atom of those at positions 2 and 4 is not part of said double bond.

One skilled in the art will appreciate that the compounds of Formula I can exist in both cis and trans stereoisomer forms. It is to be understood therefore, that the Formula I is intended to encompass not only the structural isomers, but the cis and trans stereoisomeric forms of each structural isomer and mixtures of such cis and trans forms.

The invention also comprises methods of preparing and using the Compounds I as will be described in more detail hereinafter.

The term "halogen" is used throughout this specification and claims in its generally accepted sense as embracing chlorine, bromine, iodine and fluorine.

The term "hydrocarbyl" as used throughout the specification and claims means the monovalent radical obtained by removing one hydrogen atom from the parent hydrocarbon, which latter contains 1 to 6 carbon atoms. Illustrative of such hydrocarbyl groups are alkyl of 1 to 6 carbon atoms, inclusive, such as methyl, ethyl, propyl, butyl, pentyl, and hexyl including isomeric forms thereof; alkenyl of 2 to 6 carbon atoms, inclusive, such as vinyl, allyl, butenyl, pentenyl, and hexenyl including isomeric forms thereof; and phenyl.

The term "halogen substituted hydrocarbyl" means those hydrocarbyl groups as before defined wherein from one to all of the hydrogen atoms have been replaced by halogen as defined above. Illustrative of halogen substituted hydrocarbyl are chloromethyl, trichloromethyl, 2-chloroethyl, 2-bromoethyl, 1-chlorobutyl, 2-bromohexyl, 2-chlorobutenyl, p-chlorophenyl, 2,5-diiodophenyl and the like.

The term "alkoxy of 1 to 6 carbon atoms, inclusive" means the monovalent radical of formula —O—E wherein E is alkyl of 1 to 6 carbon atoms, inclusive, as defined above. Illustrative of alkoxy of 1 to 6 carbon atoms, inclusive, are methoxy, ethoxy, propoxy, butoxy, pentyloxy, hexyloxy, and isomeric forms thereof.

The term "alkyl of 1 to 12 carbon atoms, inclusive" means the monovalent radical obtained upon removal of a hydrogen atom from a branched or linear alkane, said parent alkane having from 1 to 12 carbon atoms inclusive. Representative of such alkyl radicals are methyl, ethyl, propyl, butyl, pentyl, hexyl, heptyl, octyl, nonyl, decyl, undecyl, dodecyl and isomeric forms thereof.

The term "hydroxyalkyl of 2 to 6 carbon atoms, inclusive" means an alkyl radical as defined above having the stated carbon content and wherein a hydrogen atom has been replaced by a hydroxyl group. Illustrative of hydroxyalkyl of 2 to 6 carbon atoms, inclusive, are groups such as 2-hydroxyethyl, 3-hydroxypropyl, 2-hydroxybutyl, 4-hydroxypentyl, 3-hydroxyhexyl, and isomeric forms thereof.

The Compounds I are useful for a variety of purposes. For example, the Compounds I possess surface active properties and are useful as detergents, dispersing agents, wetting agents and the like.

The Compounds I are also useful as reactive flame retardant components of polymer systems. For example, they can be incorporated into polyester polymers following the procedure of U.S. Pat. 2,913,436 to obtain fire retardant coatings, varnishes and like useful materials.

By virtue of their double bond, the Compounds I can be incorporated into polyolefin polymer systems by copolymerization with starting monomeric components of the system. General methods of performing such copolymerizations are well known, as illustrated by the method of U.S. Pat. 3,299,015. Thus, for example, there are obtained polyethylene and polypropylene polymers having flame retardant properties.

The novel Compounds I are particularly valuable when used alone or in admixture with other known polyols to prepare fire retardant polyurethane polymers by reaction with organic isocyanates. Methods of preparing fire retardant polyurethane polymers from phosphorus containing polyols are well known; see for example Dombrow, "Polyurethanes," Reinhold Publishing Co., N.Y., pp. 1–105, (1957) and Saunders et al., "Polyurethanes: Chemistry and Technology," Part I, Interscience Pub., N.Y., N.Y., (1962).

DETAILED DESCRIPTION OF THE INVENTION

The novel Compounds I of the invention are derivatives of phospholene and named accordingly. The system of nomenclature employed throughout the specification and claims is illustrated by the following examples:

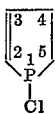 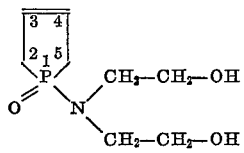

1-chloro-2-phospholene    1-diethanolamino-3-phospholene-1-oxide

The novel Compounds I of the invention are conveniently prepared by reacting the corresponding 1-halophospholene-1-oxide (II) with an alkanolamine (III). The reaction is conveniently illustrated by the schematic equation:

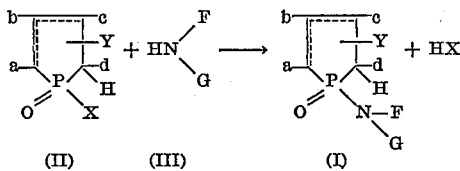

(II)      (III)         (I)

wherein $a$, $b$, $c$, $d$, Y, F, G and the broken line have the significance hereinbefore assigned to them; and X is halogen.

The process of the invention as illustrated by the above equation is carried out by admixing substantially equimolar proportions of the Reactants II and III, employing conventional reaction apparatus. Preferably the reaction mixture is continually stirred during the course of the reaction, and the apparatus employed will therefore preferably include a means for stirring the reaction mixture.

The reaction which occurs upon admixture of Reactants II and III is exothermic. The exotherm is conveniently controlled by conventional means, such as by cooling and/or bringing the reactants together slowly over a period of time. The reaction can be carried out over a broad range of temperatures, i.e.: from about $-70°$ C. to reflux temperature for the particular reaction mixture. It is preferred, however, that the reaction be carried out at a temperature below about 30° C.

Admixture of the Reactants II and III is preferably carried out in the presence of an inert organic solvent. An inert organic solvent as used in the process of the invention is an organic solvent in which the product Compounds I are soluble, and which does not enter into or in any way change the course of the desired reaction. Illustrative of such inert organic solvents are benzene toluene, xylene, n-hexane, cyclohexane and the like. Preferred as inert organic solvents in the process of the invention are the chlorinated hydrocarbons such as chlorobenzene, methylene chloride, chloroform, carbon tetrachloride, 1,2-dichloroethane and the like. The quantity of the solvent employed is such that the product Compounds I are maintained in solution as they form. In general, this is accomplished by employing a quantity of solvent in the initial reaction mixture, such that the starting Compound II has a concentration of about 0.1 to 10.0 molar.

It is necessary to the process of the invention that the hydrogen halide acid by-product be removed from the reaction mixture as it forms. This can be accomplished by any of the conventional and known methods for removal of hydrogen halide acids from reaction process units, such as for example, separation by distillation, and like methods whereby the hydrogen halide is volatilized and removed as a gas.

A preferred method of removing the halogen acid by-product from the reaction mixture is by conducting the reaction in the presence of a base such as, for example, a tertiary amine. Such bases are commonly referred to as "acid acceptors." Illustrative of acid acceptors are trimethylamine, triethylamine, trioctylamine, pyridine, quinoline and the like.

Generally, the order of addition of reaction mixture components is not critical. When the reaction mixture includes a solvent and/or an acid acceptor compound it is preferred that the halophospholene-1-oxide (II) reactant be added as the last component of the reaction mixture.

The course of the reaction can be monitored by any of the conventional analytical techniques, such as infrared spectral analysis, vapor phase chromatography, and nuclear magnetic resonance analysis. The latter method, for example, will indicate that reaction has occurred by the appearance of absorption spectra characteristic of the Compounds I, as they form.

Upon completion of the reaction, the novel compounds of Formula I are separated from the reaction mixture by conventional techniques. For example, solvent and other volatiles are stripped from the reaction mixture by evaporation, distillation and like methods. Solids are removed by filtration, centrifugation and like methods. Other standard separation techniques can also be employed to remove the Compounds I from the reaction mixture, such as countercurrent extraction, chromatographic separation and like methods.

The reactant Compounds II are 1-halophospholene-1-oxides, which are for the most part well known compounds. They can be prepared by a number of well known methods; see for example Arbuzov, et al. Izv. Akad. Nauk SSSR, Ser. Khim., 1967 (3), pp. 672–75 (1963); and U.S.S.R. Pat. 250,140. By the latter method, Compounds II are prepared by the Diels-Alder reaction of the corresponding conjugated diene with an appropriate phosphorus trihalide in the presence of a carbonyl compound such as acetone. Generally, this method results in an isomeric mixture of both the 1-halo-2-phospholene-1-oxide and the 1-halo-3-phospholene-1-oxide. The structural isomers of Formula II can be separated, when desired, by conventional methods such as fractional distillation, chromatographic separation and like procedures. The isomeric mixture of both 2-phospholene-1-oxide and 3-phospholene-1-oxide as obtained by the method of U.S.S.R. Pat. 250,140 can also be employed in the process of the invention to prepare corresponding isomeric mixtures, of the Compounds I. For many purposes, the structural isomeric mixtures of (I) so obtained can be used without separation of the two isomeric forms. When desired, however, they are readily separated by conventional methods such as countercurrent extraction, chromatographic separation and like methods.

The Compounds II can also be prepared by air oxidation of the corresponding 1 - halophospholenes. The 1-halophospholenes, as illustrated by 1 - chloro - 3 - methyl-3 - phospholene and 1 - bromo - 3,4 - dimethyl-2-phospholene are for the most part known compounds which can be prepared by the methods of Myers et al., J. Org. Chem. 36, 1285–90 (1971).

Representative of the Compounds I are 1-chloro-; 1-bromo-; 1-chloro-3,4-dimethyl-; 1-chloro-2-methyl-; 1-chloro - 3 - methyl - 2 - phospholene - 1 - oxide and 1-bromo-; 1 - bromo - 3,4 - dimethyl-; 1-bromo-3-methyl-; 1-chloro-; 1 - chloro - 3,4 - dimethyl-; 1-chloro-3-methyl-; 1,3-dichloro-3-phospholene-1-oxide and the like.

The alkanolamine (III) reactants employed in preparing Compounds I are for the most part well known compounds as is their preparation; see for example, E.H. Rodd, Chem. of Carbon Compounds, Elsevier Pub. Co., New York, N.Y., (1951), vol. I, pp. 689–694. Representative of alkanolamine Compounds III are ethanolamine, isopropanolamine, methylethanolamine, diethanolamine, bis(2-hydroxypropyl) amine, N-(2 - hydroxyethyl)-N-(2-hydroxypropyl) amine, diisobutanolamine, dipentanolamine, hexanolamine and the like.

The following examples describe the manner and process of making and using the invention, and set forth the best mode contemplated by the inventors of carrying out the invention but are not to be construed as limiting.

EXAMPLE 1

A three neck flask fitted with a mechanical stirrer is charged with a mixture of 59.7 gms. (0.569 mole) of diethanolamine, 100 ml. (0.72 mole) of triethylamine and 300 ml. of dichloromethane. The mixture is cooled to a temperature of circa —70° C. To the chilled mixture there is added with stirring over a period of 20 minutes, a mixture of 85.7 gms. (0.569 mole) of 1-chloro-3-methyl-3-phospholene-1-oxide and 1-chloro-3-methyl-2-phospholene-1-oxide (method of U.S.S.R. Pat. 250,140) in 50 ml. of dichloromethane. The ratio of 3-phospholene isomer to 2-phospholene isomer in the above mixture is 1.0:4.05 parts by weight. At the end of the addition, an additional 100 ml. of dichloromethane is added to the reaction mixture, and stirring continued for 20 minutes while maintaining the reaction mixture at a temperature of circa —70° C. Thereafter, the reaction mixture is allowed to slowly warm to room temperature, and to stand overnight. The reaction mixture is then filtered and the filtrate stripped of solvent. To the residue so obtained, about 100 ml. of benzene is added, causing precipitation of triethylamine hydrochloride. The precipitate is filtered out and the filtrate stripped of benzene solvent. The residue following evaporation of solvent is filtered and the filtrate heated to 100° C. under a pressure of 0.3 mm. of mercury for 1 hour to give a residue which is 98 gms. (78.6% of theory) of a mixture of 1-diethanolamino-3-methyl - 3 - phospholene - 1 - oxide and 1-diethanol-amino-3-methyl-2-phospholene-1-oxide in the form of a yellow oil.

The assigned structure of the product is confirmed by nuclear magnetic resonance analysis which also shows the proportion of isomers to be 1.0:4.05 by weight of the 3-phospholene-1-oxide to the 2-phospholene-1-oxide. The two isomers are separated by chromatographic separation.

Similarly, following the above procedure, but replacing the diethanolamine as used therein with an equal molar proportion of the following alkanolamines of Formula III: ethanolamine, methylethanolamine, butylethanolamine, dodecylethanolamine (all of which can be prepared by reaction of the appropriate amine with ethylene oxide, according to the method outlined in Rodd, supra, p. 690), diisobutanolamine and hexanolamine, respectively, there are obtained the corresponding mixtures of 1-ethanolamino - 3 - methyl-2- with 1-ethanolamino-3-methyl-3-; 1-(N-methyl - N - ethanol)amino - 3 - methyl-2- with 1-(N-methyl - N - ethanol)amino - 3 - methyl-3-; 1-(N-butyl - N - ethanol)amino-3-methyl-2- with 1-(N-butyl-ethanol)amino - 3 - methyl-3-; 1 - (N-dodecyl-N-ethanol)amino - 3 - methyl-2- with 1 - (N - dodecyl-N-ethanol)amino - 3 - methyl-3-; 1-diisobutanolamino-3-methyl-2- with 1 - diisobutanolamino - 3 - methyl-3-; 1-hexanolamino - 3 - methyl-2- with 1 - hexanolamino-3-methyl - 3 - phospholene - 1 - oxide, respectively. The isomer mixtures so obtained are separated by chromatographic separation to obtain the individual isomer components.

Similarly, following the above procedure but replacing the mixture of 1-chloro - 3 - methyl - 2 - phospholene-1-oxide and 1-chloro - 3 - methyl - 3 - phospholene-1-oxide as used therein with an equal molar proportion of the following compounds of Formula II:

1-chloro-;
1-chloro-2,3-dibromo-;
1-chloro-3-propyl-;
1-chloro-3-(4-chloro-4-methylpentyl)-;
1-bromo-3-phenyl-;
1,3-dichloro-2-(p-chlorophenyl)-;
1-chloro-5-vinyl-;
1-chloro-2-(2-chlorovinyl)-;
1-chloro-5-phenoxy-;
1-iodo-4-(4-methyl-3-pentenyl)-;
1-chloro-3-methoxy; and
1-chloro-2-isohexyloxy-3-phospholene-1-oxide (all of which can be prepared by reacting the appropriate conjugated diene with the corresponding phosphorus trihalide in the presence of acetone following the procedure of U.S.S.R. Pat. 250,140), there are obtained the corresponding 1-diethanolamino-;
1-diethanolamino-2,3-dibromo-;
1-diethanolamino-3-propyl-;
1-diethanolamino-3-(4-chloro-4-methylpentyl)-;
1-diethanolamino-3-phenyl-;
1-diethanolamino-2-(p-chlorophenyl)-;
1-diethanolamino-5-vinyl-;
1-diethanolamino-2-(2-chlorovinyl)-;
1-diethanolamino-5-phenoxy-;
1-diethanolamino-4-(4-methyl-3-pentenyl)-;
1-diethanolamino-3-methoxy-; and
1-diethanolamino-2-isohexyloxy-3-phospholene-1-oxide, respectively.

What is claimed is:
1. A compound of the formula:

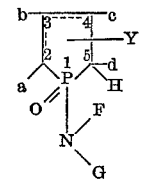

wherein $a$, $b$, $c$ and $d$ are each selected from the group consisting of hydrogen, halogen, alkoxy of 1 to 6 carbon atoms, inclusive, phenoxy, alkyl of 1 to 6 carbon atoms, inclusive, alkenyl of 2 to 6 carbon atoms, inclusive, haloalkyl of 1 to 6 carbon atoms, inclusive, haloalkenyl of 1 to 6 carbon atoms, inclusive, phenyl and halophenyl; F is selected from the group consisting of hydrogen, alkyl of 1 to 12 carbon atoms, inclusive, and hydroxyalkyl of 2 to 6 carbon atoms, inclusive; G is hydroxyalkyl of 2 to 6 carbon atoms, inclusive; the broken line indicates a double bond located between the carbon atom at position 3 and one of the two carbon atoms at positions 2 and 4; and Y is hydrogen and is attached to whichever carbon atom of those at positions 2 and 4 is not part of said double bond.

2. A compound according to claim 1 which is 1-diethanolamino-3-methyl-2-phospholene-1-oxide.

3. A compound according to claim 1 which is 1-diethanolamino-3-methyl-3-phospholene-1-oxide.

References Cited
UNITED STATES PATENTS
3,345,287   10/1967   Voetter et al. _____ 208—325

HARRY I. MOATZ, Primary Examiner

U.S. Cl. X.R.
252—8.1, 49.9, 50; 260—858, 88.1 R